United States Patent [19]

Boratgis et al.

[11] 4,187,093

[45] Feb. 5, 1980

[54] REFRIGERATOR ELECTRONIC TEMPERATURE CONTROL AND MALFUNCTION SIGNAL APPARATUS

[76] Inventors: James P. Boratgis, Lee Hill Rd.; Earle S. Pittman, 2269 Mariposa, both of Boulder, Colo. 80302

[21] Appl. No.: 874,258

[22] Filed: Feb. 1, 1978

[51] Int. Cl.² ............................................. F25B 49/00
[52] U.S. Cl. ....................................... 62/126; 62/229; 62/323; 62/324
[58] Field of Search ................. 62/126, 129, 130, 229, 62/324 R, 323 R, 160, 196 A; 165/11, 30; 62/175, 228 C

[56] References Cited

U.S. PATENT DOCUMENTS

| | | | |
|---|---|---|---|
| 3,730,819 | 5/1973 | Evalds | 165/30 |
| 4,034,570 | 7/1977 | Anderson et al. | 62/158 |

*Primary Examiner*—William E. Wayner
*Attorney, Agent, or Firm*—Ancel W. Lewis, Jr.

[57] ABSTRACT

Electronic control apparatus is disclosed for automatically controlling the operation of refrigeration units on truck-drawn trailers and providing a signal to the truck driver in the event there is a malfunction in the refrigeration unit that could result in damage to the cargo. An electronic automatic temperature control circuit includes solid state comparators which are responsive to a temperature sensor and to a temperature selector. The comparators provide output signals that selectively actuate solid state control elements which in turn control the actuation of the various load devices in the refrigeration unit to maintain the temperature in the refrigerated chamber within a selected temperature range. When the temperature in the refrigerated chamber is above a selected temperature setting to the extent that damage to the cargo might be caused, a solid state malfunction circuit controls the actuation of a solid state relay and in turn a malfunction indicator. A solid state defrost cycle control circuit is responsive to a defrost cycle sensor indicating defrosting is taking place, which overrides the actuation of the malfunction circuit for a few minutes during each multiple-hour time interval and, if the defrost cycle sensor fails, the defrost cycle control circuit is arranged to insure that the defrosting operation is still carried out.

17 Claims, 3 Drawing Figures

REFRIGERATOR ELECTRONIC TEMPERATURE CONTROL AND MALFUNCTION SIGNAL APPARATUS

FIELD OF THE INVENTION

This invention generally relates to temperature control and signal apparatus and more particularly to a novel and improved solid state temperature control and malfunction signal apparatus particularly adapted for refrigeration units in trailer-truck vehicles and the like.

BACKGROUND OF THE INVENTION

There is widespread use of refrigeration units on truck-drawn trailers for cooling the storage chambers in these trailers as food or the like is transported. A common type of refrigerator presently in use is the compression refrigerator which includes an engine-driven compressor with a slow heat load device, a slow cool load device, a fast load device that causes the heating or cooling to be carried out at a faster rate, and a defrost cycle for periodically defrosting the refrigeration coils for a relatively short time duration as required.

Truck-drawn trailers equipped with refrigeration units require a high degree of reliability since a failure thereof in the event of malfunction can result in damage or loss of the cargo being transported. A combination control and signal device for this purpose must therefore be durable, capable of many turn-ons and turn-offs, and shock-resistant to the extent that the truck and trailer are moved over a relatively rough course of travel.

Some attempts have been made to provide controls and signal devices for this purpose with remote controls and signals readily accessible to the truck driver. Known prior patents relating to this application are U.S. Pat. Nos. 2,766,439 and 3,309,480. These prior art patents in general rely on moving mechanical parts and electric relays with moving contacts that have a greater tendency to wear out on a malfunction after continued use.

Accordingly, it is an object of this invention to provide an improved temperature control and malfunction signal apparatus that is particularly suited for truck-drawn refrigerated trailers.

Another object of the present invention is to provide a simple, durable and reliable electronic control circuit for automatically controlling the operation of refrigeration units and particularly trailer-mounted refrigeration units.

A further object of the present invention is to provide an electronic temperature control and signal apparatus that is readily adapted to operate with existing sensors and the load devices in truck-drawn trailer-mounted refrigeration units and like applications.

Still a further object of the present invention is to provide a compact, self-contained, control unit that is readily mounted on a truck-drawn trailer-mounted refrigeration unit and capable of withstanding the shock associated with road travel.

Yet a further object of the present invention is to provide a novel solid state circuit with no moving mechanical parts for effecting temperature control and malfunction signaling for a refrigeration unit.

Still another object of the present invention is to provide a novel temperature control for refrigeration units that avoids reverse battery polarity, excessive battery voltage, electrical noise, and inductive surges from the controlled solenoids and relays typically found in the control circuits of known refrigeration units.

Yet another object of the present invention is to provide a refrigerator electronic temperature control and signal apparatus characterized by solid state comparators responsive to a temperature sensor and a temperature selector which in turn provide output signals suitable for actuating solid state switching elements controlling the power to the various load devices in a refrigeration unit, and in addition a solid state defrost cycle control circuit which permits defrost cycle operation as well as to override the defrost sensor mechanism in the event it should fail so that periodic defrosting of the coils continues.

SUMMARY OF THE INVENTION

Refrigerator electronic control apparatus takes the form of a compact unit mounted on a refrigeration unit on a truck drawn trailer for automatically controlling the operation of the refrigeration unit during the refrigeration of a chamber in response to a selected temperature setting, as well as signaling when a malfunction occurs in the refrigeration unit that causes the temperature in the chamber to rise above an undesirable level. This apparatus utilizes solid state control elements throughout for enhanced reliability. A temperature control circuit includes a plurality of solid state comparators responsive to a temperature sensor in the refrigerated chamber and to a selected setting on the temperature selector to provide outputs for selectively actuating the various load devices in the refrigeration unit via solid state control elements so that the chamber temperature corresponds with the setting of the temperature of the selector. A malfunction circuit having a solid state comparator responsive to the outputs of the temperature sensor and temperature selector causes the actuation of a solid state relay that in turn applies power to a malfunction indicator when the chamber temperatures are above a predetermined amount. A solid state timing circuit responsive to a defrost cycle sensor indicating the defrost cycle is on, periodically effects the actuation of a defrost cycle load device and overrides the malfunction circuit to ensure that the defrost takes place for a few minutes of each multiple-hour time interval even though the defrost cycle sensor may fail. The circuit is arranged so that the heat and cool operations cannot operate simultaneously. A further circuit operatively associated with the temperature selector ensures there is no heat operation below a selected temperature. The solid state relay also controls the application to and removal of DC power to the various circuits without the use of mechanical moving parts.

Other objects, advantages and capabilities of the present invention will become more apparent as the description proceeds, taken in conjunction with the accompanying drawings in which like parts have similar reference numerals and in which.

Figure 1:
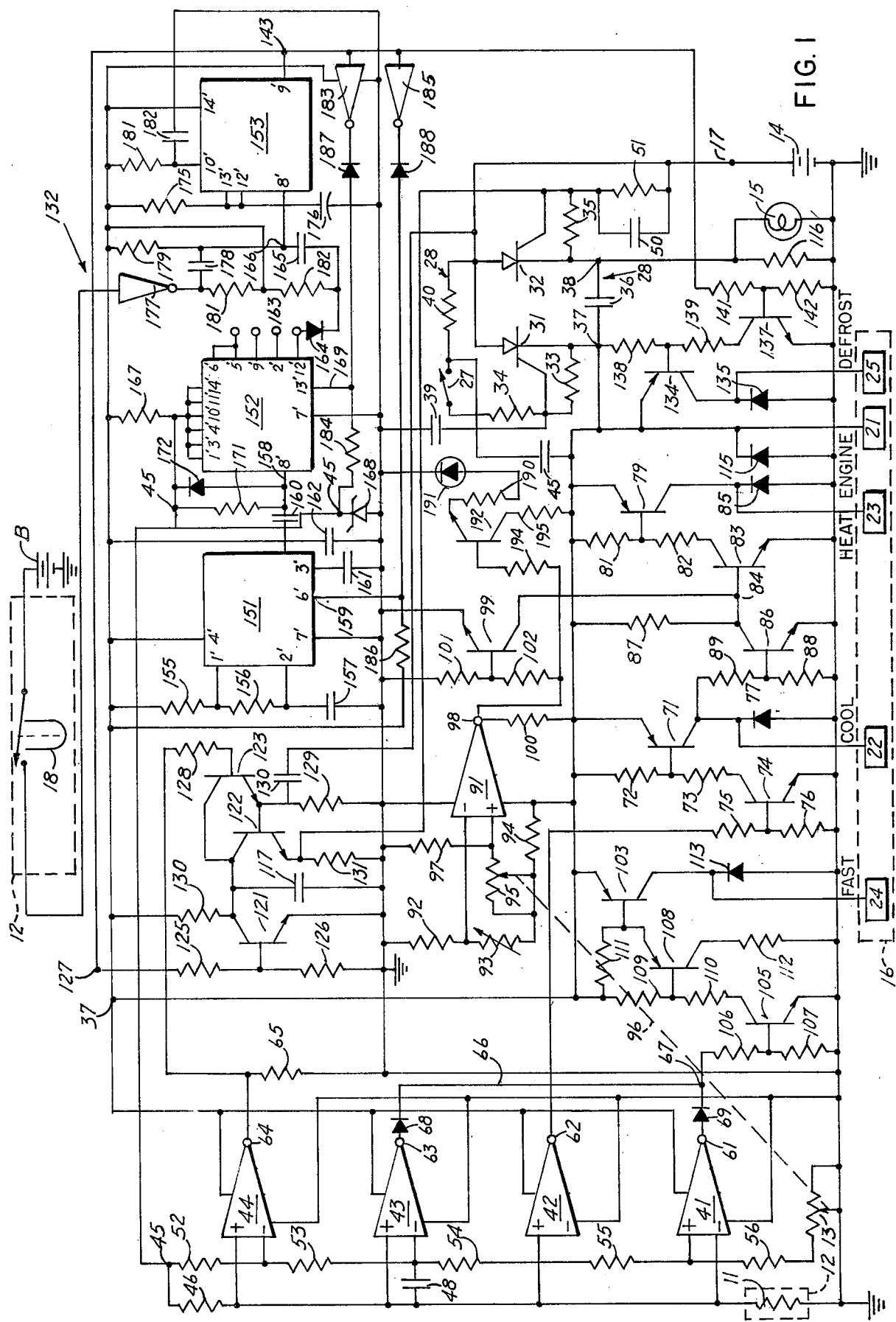
FIG. 1 is a circuit diagram embodying features of the present invention.

Referring now to FIG. 1, the circuit diagram shown generally includes one electronic circuit portion that is responsive to the output of a temperature sensor 11, in turn responsive to the temperature in a refrigerated chamber 12, and is also responsive to the output of a temperature selector 13 for each temperature setting within a range of temperatures. This circuit portion, in general, functions to selectively connect electric power from a power supply 14, herein illustrated as a DC battery 14, via an input power terminal 17 so as to effect the actuation of a malfunction indicator 15 and selected load devices in a refrigeration unit 16.

This selective actuation of the load devices in the refrigeration unit 16 maintains the temperature in the refrigerated storage chamber 12 within a selected range and the malfunction indicator 15 is actuated when the temperature in the storage chamber is excessive, and at the same time the refrigeration unit 16 is stopped when the temperature in the refrigerated chamber is excessive.

There is further provided another electronic circuit portion responsive to a defrost cycle sensor 18 which functions to override the first-mentioned circuit portion during the defrost cycle to allow the defrosting of the refrigeration unit 16 to be carried out for a few minutes during a multiple-hour time interval even though the defrost cycle sensor fails. Malfunction indicator 15 may be a light or a horn or both.

The temperature in the refrigerated chamber 12 is controlled by the selective application of the electric power from battery 14 to one of several load devices that are shown as blocks contained in refrigeration unit 16. Refrigeration unit 16 is shown to include a prime mover load device 21, such as an engine, that directly drives a compressor or heat pump unit such as is used in refrigeration for heating or cooling the volume of air in the storage chamber, depending on the temperature therein; a slow cool load device 22 which upon actuation causes the refrigeration unit to cool the storage chamber at a slow rate; a slow heat load device 23 which upon actuation causes the refrigeration unit to heat the storage chamber at a slow rate, and a fast load device 24 which upon actuation causes either a fast heat or a fast cool, depending on which load devices 22 or 23 are also actuated.

There is also provided a defrost cycle load device 25 which upon actuation causes the defrosting of the coils in the refrigeration unit 16. The engine directly drives a compressor or heat pump unit that in turn has switch-valve or solenoid operated portions so as to be capable of either heating or cooling according to demand. The defrosting is typically provided by an electric heating element juxtaposed to the evaporator coils powered by a generator-battery combination which in turn is powered by the engine (prime mover), and this heating element also has an on-off operation using a switch-valve or solenoid operated element. Since the compressor and generator-battery combination are powered by the engine, when the engine shuts off all power is removed. Selective control to each load is provided by the switch valves or electric solenoids represented schematically as blocks in the drawing. In most known refrigeration units these load devices 21, 22, 23, 24 and 25 are electric solenoids or switch-valves that are operated by a low DC voltage such as twelve volts. Load devices of this type are shown and described in U.S. Pat. No. 3,309,480.

Electric power from the battery 14 is selectively applied to the various circuits hereinafter described via normally opened push-switch 27 and a condition-responsive, solid state relay 28.

The electronic relay shown has two SCR solid state elements 31 and 32 with the anode of the battery connected to each of the anodes of elements 31 and 32. Element 31 has a resistor 33 connected between the gate-cathode junction and a resistor 34, and a normally opened push control switch 27 connected between the gate-anode junctions thereof. A resistor 35 is connected between the gate-cathode junction of element 32. A charging capacitor 36 is connected across the cathodes of the two elements 31 and 32 with one power output terminal common to one plate of the capacitor 36 and the cathode of element 31 designated by numeral 37 with the other power output terminal common to the other plate of capacitor 36 and the cathode of element 32 designated by numeral 38. A capacitor 39 is connected between the gate of element 31 and ground. A resistor 40 and capacitor 45 are connected in series with one another between terminal 17 and terminal 37. A capacitor 50 and resistor 51 are connected in parallel with one another between terminal 17 and the gate of element 32 to decrease sensitivity to voltage spikes.

In the operation of this electronic relay 28, when switch 27 is momentarily closed the battery voltage from battery 14 is applied to the gate of element 31 so that element 31 conducts and charges capacitor 36 to a particular voltage of a particular polarity which is a positive DC voltage at terminal 37 with respect to terminal 38. This DC voltage is of a magnitude of twelve volts, which is suitable for actuating the various load devices in the refrigeration unit 16 and for providing a bias for several of the circuit portions hereinafter described. Element 31 is normally conducting and element 32 is normally non-conducting. However, when pulse is applied to the gate of element 32, element 32 turns on or conducts and this turns element 31 off, and in turn a reverse charge is placed across capacitor 36 so that terminal 38 has a positive DC voltage and terminal 37 is at zero potential, which effects the actuation of the malfunction indicator 15, as described more fully hereinafter.

A comparator portion of the circuit in general functions to compare the temperature in the refrigerated chamber 12 with that of the setting of the temperature selector 13 and provides output signals indicating when temperatures in the chamber are within a particular range above and below settings on the temperature selector 13. The comparator portion shown has four identical operational amplifiers 41, 42, 43 and 44 connected as comparators. Each operational amplifier has one input connected between a resistor 46 and the temperature sensor 11. A voltage is applied across terminal 45 and ground to resistor 46 and temperature sensor 11. With this arrangement, changes in the temperature in the storage chamber 12 affecting temperature sensor 11 change the resistance in this circuit and provide an input signal to one input of each one of the operational amplifiers that varies in relation to the temperature in the refrigerated chamber.

The signal to the other input of each of the operational amplifiers 41, 42, 43 and 44 is provided by a series circuit connected between power terminal 45 and ground including resistors 52, 53, 54, 55 and 56. The value of resistance of each of these series resistors is selected so that the signal applied to each input of each operational amplifier is related to the setting on the temperature selector 13. Because each resistor has a different voltage thereacross, the amplifiers are operated at different voltages. These resistors, then, are selected in relation to the temperatures so that the input to each operational amplifier is related to the temperature in the chamber and the setting of the temperature selector. A capacitor 48 connects between the input of operational amplifier 43 and temperature sensor 11.

Operational amplifiers 41, 42 and 43 are a part of the automatic temperature control circuit. Beginning with operational amplifier 41, resistor 56 is selected such that, when the chamber temperature is greater than a temperature increment of 2° F. below the setting of the temperature selector 13, a signal is produced to turn operational amplifier 41 on and produce a signal at its output terminal 61. Resistor 55 is selected such that, when the temperature in the chamber is less than a temperature increment of 2° F. above the temperature setting of the temperature selector 13, operational amplifier 42 is turned on, providing an output signal at output terminal 62. In turn, the value of resistor 54 is selected such that, when the temperature in the chamber is greater than a temperature increment of 2° F. above the temperature setting on the selector 13, an output signal is produced at output terminal 63.

Operational amplifier 44 is a part of a malfunction circuit and resistor 53 is selected such that, when the temperature in the chamber 12 is greater than a temperature increment of 10° F. above the setting of the selector 13, a signal at one of the inputs of operational amplifier 44 is produced to generate an output signal at the output terminal 64 thereof. A load resistor 65 is connected between the output terminal 64 of amplifier 44 and ground. Output terminals 61 and 63 have diodes 68 and 69, respectively, connected thereto which in turn are connected together by a line 66 forming a common output terminal 67.

It is understood that other temperature increments may be selected. Moreover, while separate operational amplifiers 41, 42, 43 and 44 are illustrated in the drawing, it is understood that the function of these elements connected as a comparator may be provided by a single chip.

Each of the outputs of operational amplifiers 41, 42 and 43 is coupled so an output signal triggers a solid state switch or switching element to selectively cause the actuation of one of the load devices in the refrigeration unit hereinafter described. In this way the load devices are actuated to change the temperature in the refrigerated storage chamber to correspond to the setting on the temperature selector.

The electric power to the cool load device 22 is controlled by a solid state element in the form of a transistor 71 having its emitter and collector electrodes connected between the power terminal 37 and the cool load device 22. A resistor 72 is connected between the emitter base junction of transistor 71 and a resistor 73 is connected between the base of transistor 71 and the collector of a transistor 74 which serves as a driver stage to amplify the signal applied to the base electrode of transistor 71. Resistors 75 and 76 are connected at the base electrode so that, when a signal is applied from operational amplifier 42 at terminal 62 to the base of transistor 74 via resistor 75, element 74 conducts, which in turn causes transistor 75 to conduct to effect the actuation of the cool load device 22 by the voltage at terminal 37. A diode 77 is connected between the collector of transistor 71 and ground at the connection to device 22 to protect the control circuitry from inductive kickback spikes from the cool load device 22.

Electric power to the heat load device 23 is selectively controlled by a solid state switching element shown in the form of transistor 79 having its emitter-collector junction connected between power terminal 37 and the heat load device 23. A resistor 81 is connected across the emitter-base junction of transistor 79, and between its base-collector junction there is connected a resistor 82 along with the emitter-collector junction of a driver transistor 83. A driver transistor 83 has an input terminal 84 at the base electrode with the signal applied to the base electrode of transistor 83 being amplified to trigger the base electrode of transistor 79 which upon conduction effects the actuation of head load device 23. A diode 85 is connected between the collector electrode and ground of transistor 79 to protect the control circuitry from inductive kickback spikes from the heat load device 23.

A solid state control element in the form of transistor 86 is coupled between transistors 71 and 79 in such a way that, when transistor 71 is turned on, transistor 79 is turned off, and vice versa. The collector electrode of transistor 86 connects to terminal 84 at the base electrode of transistor 83 and this collector electrode is also connected to power terminal 37 via resistor 87. The emitter electrode of transistor 86 is connected to ground. A resistor 88 is connected between the emitter-base junction of transistor 86 and a resistor 89 is coupled between the collector electrode of transistor 71 and resistor 88. Normally, when transistor 71 is on, transistor 86 is turned on by coupling resistor 89. With transistor 86 on, the base of transistor 83 at terminal 84 becomes grounded, causing transistor 83 to turn off. Normally, transistor 83 is biased on via resistor 87. With transistor 83 off, transistor 79 is turned off so that heat load device 23 is turned off. A lower limit control turns heat load device 23 off by grounding terminal 84, as described hereinafter.

The lower limit temperature control circuit includes an operational amplifier 91 similar to amplifiers 41, 42, 43 and 44 above described and connected as a comparator. One input of amplifier 91 is connected between two resistors 92 and 93 connected between power terminal 37 (including a voltage drop across resistor 94) and ground. Resistor 93 is a trimmer resistor. A variable resistor 95 is connected between the other input of amplifier 91 and resistor 94 with the other side of resistor 94 being connected to power terminal 37. The variable resistor 95 and selector 13 are mechanically coupled, as indicated by dashed lines 96, so that they rotate conjointly, as by being mounted on a common shaft.

Another resistor 97 is connected between the variable resistor 95 and ground. The output terminal 98 of the operational amplifier 91 is coupled to the solid state switching stage which includes a transistor 99 having its emitter-collector junction connected between ground and terminal 84. A resistor 100 is connected between the output terminal 98 and the power terminal 37. A resistor 101 is connected between the base-emitter junction of transistor 99 and a resistor 102 is connected between the base electrode of transistor 99 and output terminal 98 of amplifier 91.

The components of this circuit are related so that operational amplifier 91 cuts off the power to the heat load device 23 when the temperature in the chamber is below a selected temperature such as 15° F. This is the temperature at which frozen foods are being shipped.

The output of operational amplifier 91 at terminal 98 is turned on to turn on transistor 99, which grounds the base of transistor 83 and in turn disables or turns off transistor 79.

As an optional feature, there is provided a light-emitting diode 191 with a resistor 190 in series therewith in a control circuit inclusive of transistor 192 and resistors 194 and 195 arranged so that, when transistor 99 conducts, the voltage at the base of transistor 192 turns this transistor on and causes diode 191 to light up to indicate that the chamber is below 15° F.

A solid state switching element in the form of transistor 103 has its emitter-collector junction connected between the power terminal 37 and the fast load device 24. This element 103 is triggered or turned on by a signal provided at terminal 67 of amplifier 41, which signal in turn is amplified by a two-stage solid state driver or amplifier. The first stage has a transistor 105 with its base electrode connected between resistors 106 and 107 and terminal 67 being connected across these resistors and ground. Resistor 107 is connected across the emitter-base junction of transistor 105.

In turn transistor 108 has its base electrode connected between resistors 109 and 110 which are in series between terminal 37 and the collector electrode of transistor 105. A resistor 111 is in series with resistor 109 between the emitter-base junction of transistor 108 and a resistor 112 is connected between the collector electrode of transistor 108 and ground. Again a diode 113 is connected between the collector electrode of transistor 103 and ground and to a connection common to fast load device 24. Thus, when an output signal is produced by either of operational amplifiers 41 or 43, a signal is applied to the base of transistor 105 and transistors 108 and 103 conduct to effect the actuation of the fast load device 24 by the electric power at terminal 37.

A malfunction circuit which includes operational amplifier 44 is connected as a comparator coupled to sensor 11 and control 13 with the output terminal 64 which is coupled via a Darlington configuration to the electronic relay circuit 28 and operates so that, when there is an output at operational amplifier 44, relay 28 is actuated, which in turn actuates the malfunction indicator 15 and at the same time the relay 28 effectively removes the electric power from the prime mover load device 21 driving the compressor or heat pump in the refrigerator unit 16.

Referring now to the load side of the circuit, the prime mover load device 21 is connected directly to power terminal 37 so that the prime mover load device 21 is actuated via relay 28 as soon as control switch 27 is pressed. Again a diode 115 is connected between terminal 37 and ground at the connection of prime mover load device 21 for protection of circuitry against inductive kickback spikes. The malfunction indicator 15 is connected to the normally zero voltage terminal 38 of the relay 28 and a resistor 116 is connected in parallel with the indicator 15. In this way, when switch 27 is pressed there is approximately zero voltage at terminal 38 and the malfunction indicator 15 is not actuated.

The malfunction circuit includes a capacitor 117 that is alternately charged and discharged to trigger the relay 28 under the control of a transistor 121 and the control of a common collector Darlington configuration circuit arrangement including solid state elements in the form of transistors 122 and 123.

Transistor 121 has its base electrode connected between resistors 125 and 126 which in turn are connected between terminal 127 and ground. Resistor 126 is connected between the base-emitter junction of transistor 121. A charging resistor 130 is connected between the collector electrode of transistor 121 and power input terminal 37 through which the capacitor is instantaneously charged when control switch 27 is pressed. The capacitor 117 is connected between the collector electrode of transistor 121 and ground. On the other side the base electrode of transistor 123 is connected through a resistor 128 to the output terminal 64 of operational amplifier 44.

The collector electrodes of transistors 122 and 123 are connected together as a common collector Darlington configuration. The capacitor 117 is connected between these common collector electrodes and ground. A resistor 129 is connected between the emitter electrode of transistor 123 and ground and a resistor 131 is connected between the emitter electrode of transistor 122 and ground in the Darlington configuration. A capacitor 130 is connected between the emitter electrode of transistor 123 and terminal 17 to contribute to the noise immunity of the control.

Briefly, in the operation of the malfunction circuit, when because of a malfuncton the temperature in the storage chamber 12 continues to rise until it reaches a selected temperature increment such as 10° F. above the setting of temperature selector 13, operational amplifier 44 is turned on providing an output signal at terminal 64. This applies a signal to the base of transistor 123 and transistors 123 and 122 conduct so that capacitor 117 is discharged through transistor 122 to apply a signal at the gate of SCR element 32, which in turn produces a voltage at terminal 38 causing the malfunction indicator 15 to turn on. At the same time, the voltage at terminal 37 goes to zero and the prime mover load device 21 is stopped or disabled.

The defrost cycle control circuit generally operates to defrost the coils, represented as a defrost cycle load device 25, in the refrigeration unit 16 for a selected relatively short duration, on the order of a period of fifteen to twenty minutes each selected multiple-hour time interval, such as approximately every four hours. The defrost cycle control circuit is triggered by the defrost cycle sensor 18 in the storage chamber, illustrated as a water column and associated electric switch coupled to a DC battery B. In operation, the defrost load device 25 is triggered either by the signal produced by sensor 18 through an electronic timer circuit 153 or directly by a signal produced by the timer circuit 153. In either case the actuation of a load device 25 causes a defrosting to occur for the selected short duration of about twenty minutes every approximately four hours.

At the load side of the circuit shown in FIG. 1, a solid state switch in the form of transistor 134 is connected between power terminal 37 and defrost cycle load device 25, and more specifically the collector-base junction thereof, so that, when the transistor 134 conducts, the actuation of the defrost cycle load device 25 is effected. Again, a diode 135 is connected between load device 125 and ground at the collector electrode of transistor 134 to prevent inductive kickbacks from damaging circuity of control.

A driving or power amplifying stage for transistor 134 is provided by a solid state transistor 137 having two series resistors 138 and 139 connected between the collector electrode of transistor 137 and power terminal 37 with the base electrode of transistor 134 connected between resistors 138 and 139. The emitter electrode of transistor 137 is connected to ground. The base electrode of transistor 137 is connected between two series resistors 141 and 142. The timer circuit 153 has an output terminal designated 143 connected across resistors 141 and 142 so that the timer circuit 153 controls the conduction of transistor 137 and in turn transistor 134 to effect the actuation of defrost cycle load device 25.

The timer circuit 153 shown has an astable multivibrator circuit 151 coupled to a counter 152 via capacitor 160 which in turn triggers the monostable multivibrator circuit 153 having its output at terminal 143, above discussed, which controls the actuation of the defrost cycle load device 25. Briefly, circuit 153 is a short-duration timer and times in fifteen to twenty minute intervals. Together, circuits 151 and 152 function as a multiple-hour interval timer producing an output signal from circuit 152 approximately every four hours.

Specifically, circuit 151 has two external resistors 155 and 156 and a capacitor 157 connected in series with one another between the power terminal 37 and ground. Two inputs of the circuit 151 are connected across resistor 156. The output of circuit 151 is connected to the input of circuit 152 overline 158. Circuit 151 has a reset input 159. Capacitors 161, 162 are associated with circuit 151.

Counter circuit 152 has a resistor 167 and a Zener diode 168 connected between power terminal 37 and ground which provides a lesser DC voltage, on the order of five volts, at terminal 45, which provides a bias voltage for a plurality of input lines into circuit 152. Since circuit 152 operates at five volts (controlled by Zener diode 168), diode 172 limits voltage to the input of counter 152 by feeding overvoltages back to Zener diode 168, thus avoiding overvoltages above five volts into circuit 152. A resistor 171 and a diode 172 are each connected between terminal 45 and the input to circuit 152. Diode 172 protects circuit 152 from overvoltages at 168 through Zener diode 168. A reset input terminal for circuit 152 is designated 169. An output terminal designated 163 is connected to an input 166 of circuit 153 via a diode 164 and capacitor 165.

Circuit 153 has an external resistor 175 and an external capacitor 176 connected between power terminal 37 and ground, with two inputs into circuit 153 connected between resistor 175 and capacitor 176. A resistor 181 and capacitor 182 are connected in series between terminal 37 and ground. In this circuit the external capacitor 176 is initially held discharged and, upon the application of a pulse to terminal 166, a short circuit is effected across capacitor 165 which drives the output at terminal 143 to a high state. A comparator inside circuit 153 then discharges the capacitor and drives the output at 143 to a low state.

The circuit 153 triggers on a negative going input signal and, once triggered, remains in that state until a set time has elapsed, even if it is triggered again during the time interval. Once triggered the circuit 153 will remain in this state until the set time has elapsed even if it is triggered again during this time interval.

Another input to circuit 153 is provided by the output from the defrost cycle sensor 18 which is connected through a CMOS inverter 177 and capacitor 178 to input 166. A resistor 179 connects between power terminal 37, terminal 166, and capacitor 178. Capacitor 178 ensures that circuit 153 is triggered by only a single pulse from sensor 18.

A CMOS inverter 183 is connected between the output terminal 143 to circuit 153 and the reset input 169 of circuit 152 via a diode 187 with a resistor 184 being connected between input 169 and terminal 45. In turn, a CMOS inverter 185 is connected between the output terminal 143 of circuit 153 and the reset input 159 of circuit 151 via a diode 188. These inverter circuits 183 and 185 reset the cycle of circuits 151 and 152 each time the output of circuit 153 at terminal 143 goes from a high state to a low state. In this way the defrost cycle occurs every four hours by a negative-going pulse produced by sensor 18 via CMOS inverter 177 or by a pulse produced by circuit 152, and this occurs even if sensor 18 malfunctions.

In short, the timer circuit 153 controls the operation of the defrost load device 25 by overriding a faulty sensor 18, since capacitor 178 will not pass additional pulses if sensor 18 remains on continuously. It is understood that a timer circuit 153 adapted to be triggered by a positive-going pulse from the sensor 18 may also be used. A commercially available circuit suitable for timer 153 is the signetics dual monolithic timing circuit of Texas Instruments, Incorporated in which one-half of a 556 is used for circuit 151, the other half of a 556 is used as circuit 153, and an N8281 is used as circuit 152.

OPERATION

A full sequence for the electronic circuit shown in FIG. 1 will now be explained. The temperature control for most food trucks operates from a 12-volt storage battery 14. When the electric power is applied from the battery to the electronic relay 28 and push-switch 27 is momentarily pressed, SCR 31 is on until a malfunction occurs. The bipolar commutation capacitor 36 charges with a positive voltage at the cathode of SCR 31 through charging and load resistor 116 and the malfunction indicator 15. With a positive voltage at terminal 37 the load device 21, located in the refrigeration unit, can now be activated to start the compressor engine and capacitor 117 is charged in readiness for use through resistor 130.

Assuming that the temperature sensed by sensor 11 is more than 2° F. below the setting of selector 13, only operational amplifier 41 is on, causing power to be applied to load device 24 because transistor 103 is turned on. Simultaneously, in this state, transistor 79 is on because transistor 83 is on and transistor 86 is off, causing heat load device 23 to be activated. Load devices 24 and 23 being on simultaneously effect fast-heat from compressor unit 16. When the temperature rises to less than 2° F. below the setting of selector 13, operational amplifier 41 turns off so that only the slow-heat load device 23 is on, and at this point transistor 105 turns off and in sequence transistors 108 and 103 turn off. When the temperature rises to the setting of selector 13 and above, but less than 2° F. above the dial setting, operational amplifier 42 turns on, causing cool load device 22 to be turned on because the output voltage from operational amplifier 42 turns transistor 74 on and in sequence transistor 71 turns on.

Normally, the temperature in the refrigerated chamber will idle within this span of 2° F. above and below the setting of selector 13. However, if the temperature continues to rise 2° F. above the selector setting, operational amplifier 43 turns on, causing the fast load device 24 to turn on again to effect a fast cool. This should again bring the temperature to the plus or minus 2° F. shown relative to the setting of the selector 13.

If, however, the actuation of load devices 24 and 22 fails to lower the temperature in the chamber because of a malfunction and it continues to rise until it reaches 10° F. above the dial setting, then the operational amplifier 44 is turned on. The turning on of operational amplifier 44 causes the Darlington configuration circuit, including transistors 122 and 123, to discharge capacitor 117 through transistor 122 to apply a pulse to the gate of SCR 32, turning SCR 32 on and at the same time capacitor 36 turns SCR 31 off. The electric power is then cut off from the temperature control circuitry and the prime mover or engine 21 to the refrigeration unit is turned off. With SCR 31 conducting, the malfunction indicator 15 turns on and a light or sound signal from indicator 15 alerts the operator of the truck that a malfunction has occurred. Thereafter nothing will function until control switch 27 is pressed to turn SCR 31 on again.

During the defrost cycle the load device 25 is biased by the voltage at terminal 37 through the conduction of transistors 134 and 137, transistor 137 being turned on by the output from the duration timer through resistor 141. Simultaneously, duration timer circuit 153 turns on transistor 121 through resistor 125 causing capacitor 117 to discharge through the collector-emitter junction of transistor 121 so that the gate of SCR 32 does not trigger during the defrost cycle. The temperature control portion of the circuit is thus ready to lower the temperature to the dial setting again. However, if there is a malfunction in the defrost sensor 18 during the defrost cycle, the on timer of the defrost load device 25 is limited by the duration timer circuit 153, which in turn is controlled by the pulse from the combined operation of circuits 151 and 152.

The interval timer circuit 152 cycles the defrost to occur about every four hours, depending upon time selection. Capacitor 178 ensures that the duration time of circuit 153 is triggered by only a single pulse from the refrigeration unit sensor 18 in the refrigeration unit. The power amplifier transistor 137 is turned on by duration timer circuit 153 as this circuit is triggered from the pulse of capacitor 178 or by interval timer circuits 151 and 152. If the pulse through capacitor 178 triggers the duration timer 153 first, then the interval timer circuits 151 and 152 are reset through inverters 183 and 185 to start the cycle from the beginning. If the interval timer triggers the duration timer first, then the sensor 18 is reduced to minimum and/or zero level. This assures that the defrost will take place at least every approximately four hours and, if the defrost cycle sensor 8 remains on indefinitely due to malfunction, the circuits 151, 152 and 153 will govern the defrost cycle duration by overriding the faulty sensor 18, since capacitor 178 will not pass additional trigger pulses if sensor 18 remains on continuously.

The operational amplifier 91 cuts off the heat cycle below 15° F., as frozen foods are being shipped at these temperatures. Variable resistor 95, ganged with the selector 13, assures that operational amplifier 91 turns on at 15° F. and below, and this is set by the adjustment of trimmer resistor 93. The output of operational amplifier 91 turns transistor 99 on and the conduction of transistor 91 in turn maintains transistor 83 off. As previously explained, with transistor 83 off transistor 79 remains off, thus turning off the heat load device 23. When transistor 99 conducts, transistor 192 also conducts causing the light-emitting diode 191 to light up to indicate that operational amplifier 91 is on during the heat turn-off below 15° F.

Figure 2:
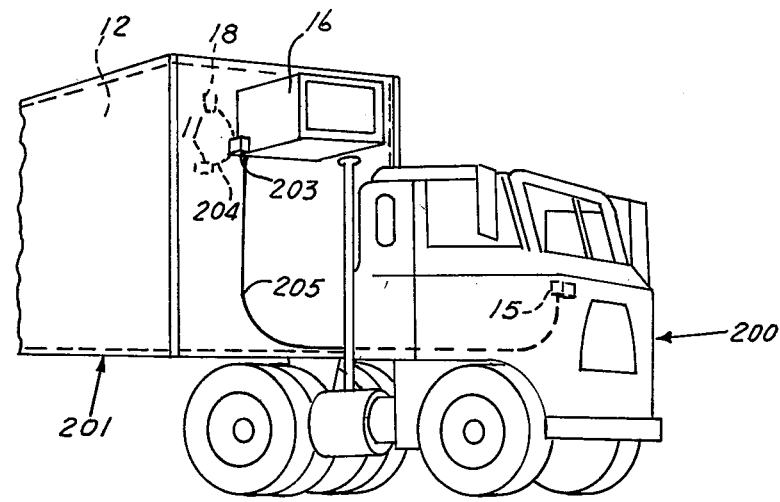
FIG. 2 is a perspective view of a refrigeration unit on a truck-drawn trailer on which electronic control apparatus of the present invention is shown mounted.
Figure 3:
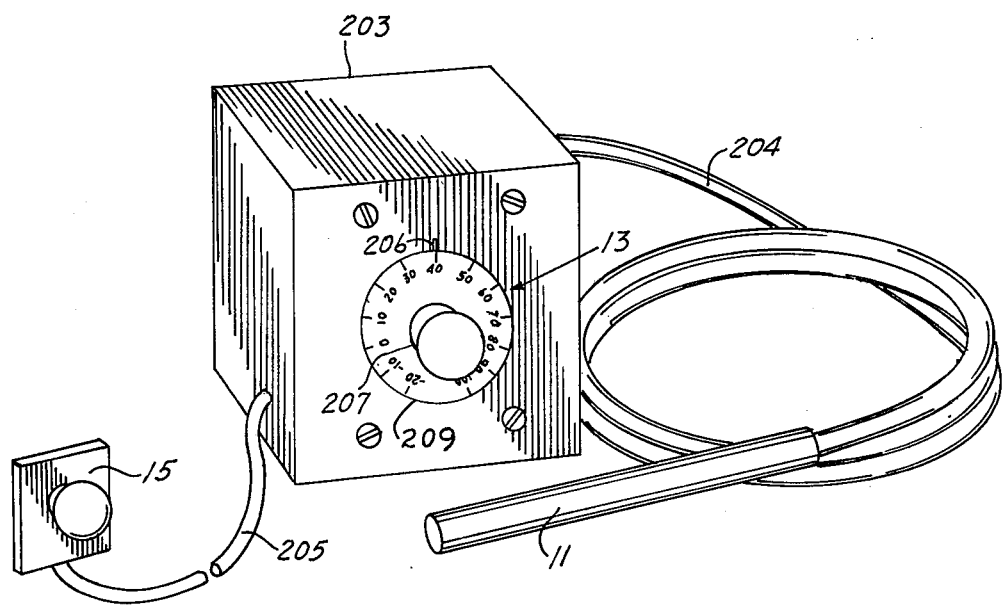
FIG. 3 is a perspective view of a control unit with associated devices embodying features of the present invention.

Referring now to FIGS. 2 and 3, there is shown a truck 200 with a trailer 201 providing a refrigerated chamber 12, and a refrigeration unit 16 is mounted on the front of the trailer and connected in an operative association to cool and heat the refrigerated chamber in a conventional manner. The temperature sensor 11 and defrost cycle sensor 18 are shown as inside the chamber 12.

The circuit above described is contained in a box or housing 203 having a current-carrying cable 204 extending therefrom and carrying the temperature sensor 11 in the form of a probe at the free end. The probe has a resistance that varies with temperature changes when a voltage is applied thereto, as shown in the circuit in FIG. 1. The housing 203 has the temperature selector 13 mounted on the front thereof.

The temperature selector 13 is a variable resistor across which an electric voltage is applied, as shown in FIG. 1, and the resistance in the circuit changes as a control shaft 207 is rotated. A dial 209 is mounted for rotation on shaft 207 and has temperature increment indicia, as ten-degree Fahrenheit increments between −20° F. and +100° F. An indicator mark 206 alines with the temperature indicia for the setting of the selector at a particular temperature setting for the chamber.

The housing 203 is shown mounted on the inside of the housing of the refrigeration unit and the selector 13 is visible and hand-movable through an opening in the housing. Typically, the malfunction indicator 15 will be mounted in the cab of the truck, as shown in FIG. 2, so that the driver is notified immediately upon malfunction. This indicator is illustrated as an electric lamp but may be an audible signal device such as a bell or the like.

Although the present invention has been described with a certain degree of particularity, it is understood that the present disclosure has been made by way of example and that changes in details of structure may be made without departing from the spirit thereof.

What is claimed is:

1. In refrigerator electronic control apparatus for controlling the temperature in and providing a malfunction signal for a refrigeration unit associated with a refrigerated chamber, the combination comprising:
   temperature sensor means for said chamber;
   temperature selector means for said chamber having a range of temperature settings; and
   electronic circuit means including:
   temperature reference means operatively associated with said temperature selector, said temperature reference means establishing a plurality of temperature reference points at selected temperature increments above and below a set point,
   a comparator associated with each of said temperature reference points, each comparator responsive to an output of the associated set point and to an output of said temperature sensor means, and
   control means including a plurality of solid state control elements, each control element responsive to an output of one of said comparators for alternately effecting the actuation of a heat load device in said refrigeration unit when the temperature in said chamber is a selected temperature increment below said set point and effecting the actuation of a cool load device in said refrigeration unit when the temperature in said chamber is a selected temperature increment above said set point to automatically maintain the temperature in said chamber within a selected temperature range and for also effecting the actuation of a malfunction indicator and disabling a prime mover load device to stop said refrigeration unit in the event of a malfunction in said refrigeration unit when the temperature in said chamber exceeds a selected maximum temperature reference point above said set point.

2. In refrigerator electronic control apparatus as set forth in claim 1 wherein said temperature sensor means is in the form of a probe across which an electric voltage is applied and having a resistance that changes in relation to changes in temperature.

3. In refrigerator electronic control apparatus as set forth in claim 1 wherein said temperature selector means is in the form of a variable resistor across which an electric voltage is applied having a resistance that changes in relation to the rotation of a control shaft.

4. In refrigerator electronic control apparatus as set forth in claim 3 wherein said control shaft has a dial calibrated in temperature increment indicia rotatable conjointly therewith and an indicator mark that alines with said indicia for establishing a selected temperature for said chamber.

5. In refrigerator electronic control apparatus as set forth in claim 3 including shut-off means operatively associated with the control shaft for disabling any heating operation by said refrigeration unit when said chamber temperature is below a preselected temperature.

6. In refrigerator electronic control apparatus as set forth in claim 1 wherein said electronic circuit means is contained in a housing adapted to mount in juxtaposition to said refrigeration unit having first electric conductor means coupled between said housing and said temperature sensor means and second electric conductor means coupled between said housing and said malfunction indicator.

7. In refrigerator electronic control apparatus as set forth in claim 1 wherein said comparator means includes a first solid state comparator providing an output signal when the temperature of said chamber is greater than a selected temperature increment below the setting of said temperature selector means, a second solid state comparator providing an output signal when the temperature of said chamber is less than a selected temperature increment below the setting of said temperature selector means, and a third solid state comparator providing an output signal when the temperature of said chamber is greater than a selected temperature increment above the setting of said temperature selector means.

8. In refrigerator electronic control apparatus as set forth in claim 7 including a fourth comparator providing an output signal when the temperature in said chamber is greater than a selected temperature increment above the temperature increment for said third comparator.

9. In refrigerator electronic control apparatus as set forth in claim 7 wherein said control means includes a solid state control element actuated by each of said comparators for effecting the actuation of an associated load device in said refrigeration unit.

10. In refrigerator electronic control apparatus as set forth in claim 8 wherein said control means includes a solid state relay means connected between an electric power input terminal and said malfunction indicator, the output signal of said fourth comparator being a part of a malfunction circuit used to trigger said relay means which operates to remove the electric power to stop said refrigeration unit and to actuate said malfunction indicator.

11. In refrigerator electronic control apparatus as set forth in claim 10 wherein said solid state relay means includes a pair of silicon controlled rectifiers operatively associated with a capacitor to reverse the polarity of the charge on said capacitor depending on which of said silicon controlled rectifiers is conducting.

12. In refrigerator electronic control apparatus as set forth in claim 10 including a power control switch between said input terminal and said relay means.

13. In refrigerator electronic control apparatus as set forth in claim 10 wherein said refrigeration unit has a defrost control cycle load device and a defrost cycle sensor providing an output signal when said defrost cycle is on, said electronic circuit means further including a solid state defrost cycle control circuit for overriding said malfunction circuit to enable the actuation of said defrost cycle load device for a multiple-minute time interval for each multiple-hour time interval.

14. In refrigerator electronic control apparatus as set forth in claim 1 wherein said control circuit means includes means to automatically shut off the power to a cooling load device in said refrigeration unit when the power is applied to a heating load device in said refrigeration unit and to automatically shut off the electric power to said heating load device when the electric power is applied to said cooling load device.

15. In refrigerator electronic temperature control and malfunction signal apparatus for a refrigeration unit associated with a refrigerated chamber, the combination comprising:

temperature sensor means responsive to the temperature in said chamber;

temperature selector means for said chamber having a range of temperature settings;

a malfunction indicator; and electronic circuit means including:

temperature reference means operatively associated with said temperature selector, said temperature reference means establishing a plurality of temperature reference points at selected temperature increments above and below a set point, a comparator associated with each of said temperature reference points, each comparator responsive to an output of the associated set point and to an output of said temperature sensor means, control means including a plurality of solid state control elements, each control element responsive to an output of one of said comparators for alternately effecting the actuation of a heat and cool load device in said refrigeration unit when the temperature in said chamber is a selected temperature increment below said set point and effecting the actuation of a cool load device in said refrigeration unit when the temperature in said chamber is a selected temperature increment above said set point to automatically maintain the temperature in said chamber within a selected temperature range and for also effecting the actuation of a malfunction indicator and disabling a prime mover load device to stop said refrigeration unit in the event of a malfunction in said refrigeration unit, and defrost cycle control means responsive to an output signal from a defrost cycle sensor including a timing circuit and a solid state control element for effecting the actuation of a defrost cycle load device in said refrigeration unit for a selected duration for a succession of time intervals longer than said duration when the temperature in said chamber exceeds a selected maximum temperature reference point above said set point.

16. In refrigerator electronic temperature control and malfunction signal apparatus as set forth in claim 15 wherein said timing circuit includes a duration timer in the form of an astable multivibrator and a counter together with a time interval timer in the form of a monostable multivibrator circuit with the output of said monostable multivibrator circuit resetting each said astable multivibrator and counter.

17. The combination with a refrigeration unit having a prime mover load device, a slow heat load device, a slow cool load device, a fast load device, and a defrost cycle load device mounted on the side wall of a truck-drawn trailer having a refrigerated chamber, of an electronic temperature control and malfunction signal apparatus comprising:

temperature sensor means for sensing the temperature in said chamber refrigerated by said refrigeration unit;

temperature selector means having a range of temperature settings for selecting a temperature for said chamber;

an electric power input terminal to which electric power is applied;

a power control switch coupled to said input terminal;

a solid state relay coupled to said power control switch;

a malfunction indicator coupled to said relay; and electronic circuit means coupled between said temperature sensor means, temperature selector means, said refrigeration unit and said relay, said electronic circuit means including:

a temperature control circuit having temperature reference means operatively associated with said temperature selector, said temperature reference means establishing a plurality of temperature reference points at selected temperature increments above and below a set point, a solid state comparator associated with each of said temperature reference points, each comparator responsive to an output of the associated set point and to an output of said temperature sensor, and solid state control elements each responsive to an output signal from one of said comparators for alternately effecting the actuation of said slow heat, slow cool and fast load devices when the temperature in said chamber is at a particular level in relation to said set point for automatically maintaining the temperatures in said chamber within a selected temperature range:

a malfunction circuit having a solid state malfunction comparator associated with one of said temperature reference points and said temperature sensor providing an output signal when the temperature in the chamber is in excess of a selected temperature increment above a setting on said temperature selector means, and a solid state charging circuit including a Darlington configuration triggered by the output from said malfunction comparator coupled to said relay to couple electric power from said input terminal to said malfunction indicator via said relay when the temperature of said malfunction comparator provides an output signal; and a solid state defrost cycle control circuit having a duration timing circuit responsive to an output signal from a defrost cycle sensor indicating a defrost cycle is on to effect the actuation of the defrost cycle load device for a multiple-minute time interval for each multiple-hour time interval, and a time interval timing circuit producing an output signal selected every multiple-hour time interval, said timing circuit being pulsed each time said duration timing circuit receives an output signal from the defrost cycle sensor, whereby said defrost cycle will take place every multiple-hour time interval even though no output signal is received from said defrost cycle sensor.

* * * * *